United States Patent

Gerencsér

(10) Patent No.: US 9,457,865 B2
(45) Date of Patent: Oct. 4, 2016

(54) BICYCLE WITH MOTOR ASSISTED FOLDING

(71) Applicant: GM Global Technology Operations LLC, Detroit, MI (US)

(72) Inventor: Gábor Gerencsér, Székesfehérvár (HU)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/631,231

(22) Filed: Feb. 25, 2015

(65) Prior Publication Data

US 2016/0244120 A1     Aug. 25, 2016

(51) Int. Cl.
B62K 15/00 (2006.01)

(52) U.S. Cl.
CPC ........ B62K 15/008 (2013.01); *B62J 2300/004* (2013.01)

(58) Field of Classification Search
CPC ............................ B62K 15/008; B62K 15/006
USPC ......................................................... 280/287
See application file for complete search history.

(56) References Cited

U.S. PATENT DOCUMENTS

| | | | |
|---|---|---|---|
| 5,553,351 A * | 9/1996 | Starks ................ | E05D 11/1007 16/223 |
| 6,623,023 B2 * | 9/2003 | Niitsu ................ | B62K 15/008 180/220 |
| 7,059,621 B2 * | 6/2006 | Di Blasi ............. | B62K 15/008 280/287 |
| 7,451,848 B2 * | 11/2008 | Flowers ............... | A61G 5/045 180/208 |
| 8,894,084 B1 * | 11/2014 | Yap ...................... | B62K 15/008 280/278 |
| 9,248,881 B2 * | 2/2016 | Timonen ............. | B62K 15/006 |
| 2010/0212978 A1 * | 8/2010 | Huang ................ | B62K 15/008 180/65.31 |
| 2012/0169029 A1 * | 7/2012 | Marais ................ | B62K 15/006 280/287 |
| 2015/0035257 A1 * | 2/2015 | Zaid ...................... | B62K 3/002 280/641 |
| 2015/0209205 A1 * | 7/2015 | Ransenberg ........ | B62K 15/008 280/641 |
| 2015/0274243 A1 * | 10/2015 | Timonen ............. | E05D 11/1007 280/287 |
| 2015/0321722 A1 * | 11/2015 | Dadoosh ............. | B62K 3/002 180/208 |

\* cited by examiner

*Primary Examiner* — Kevin Hurley
*Assistant Examiner* — Michael Stabley
(74) *Attorney, Agent, or Firm* — BrooksGroup (57) ABSTRACT

A number of variations may include a bicycle with motor assisted folding.

18 Claims, 7 Drawing Sheets

BICYCLE WITH MOTOR ASSISTED FOLDING

TECHNICAL FIELD

The field to which the disclosure generally relates to electric bicycles.

BACKGROUND

Electric bicycles may include a battery and a motor.

SUMMARY OF ILLUSTRATIVE VARIATIONS

A number of variations may include motor assisted folding.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
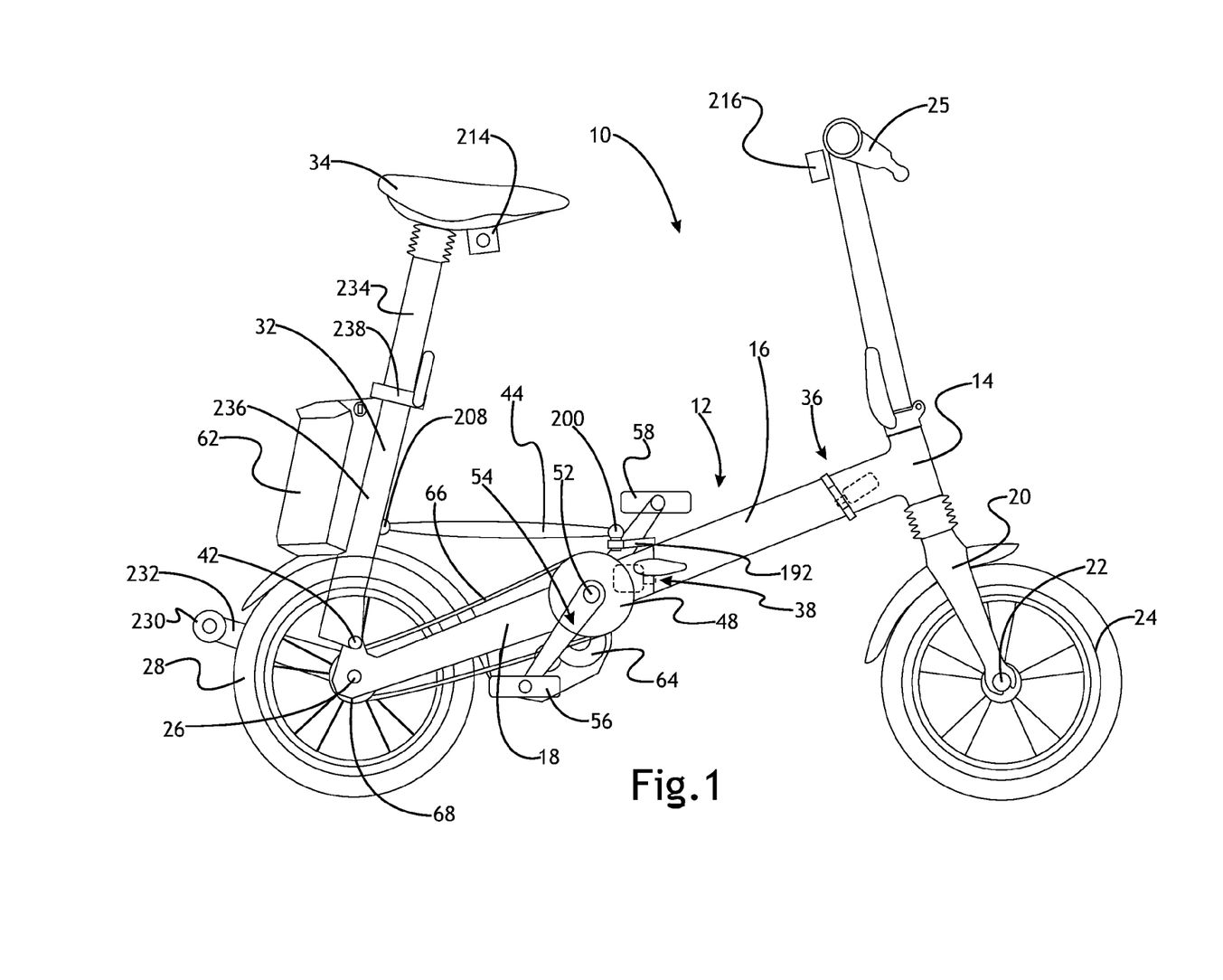
FIG. 1 is a side view of the bicycle according to a number of variations.

A number of variations are illustrated in FIG. 1, which may include a bicycle 10 including a frame, generally indicated at 12, which may include a front frame 14, a middle frame 16 and a rear frame 18. The front frame 14 may have a fork assembly 20 with front axle 22 that supports front wheel 24, and a handle bar assembly 25 by which a user will turn the front wheel 24 to turn the bicycle. The rear frame 18 may have a rear axle 26 that supports rear wheel 28 and a seat support 32 that supports a seat 34.

The front frame 14 may be connected to the middle frame 16 by a front hinge assembly, generally indicated at 36, that will be described in detail hereinafter. The rear frame 18 may be connected to the middle frame 16 by a rear hinge assembly, generally indicated at 38, that will be described hereinafter.

The seat support 32 may be pivotally connected to the rear frame 18 by a pivot 42, which may be located just above the rear axle 26. As seen in FIG. 1, a support rod 44 extends between the middle frame 16 and the seat support 32 to support the seat support 32 at its position of FIG. 1 so that the seat support 32 will not pivot about its pivot 42 during use of the bicycle 10.

The bicycle 10 may have an electrical propulsion system, as well as a traditional pedal system, so that the user can choose between electric powered riding and pedal powered riding. A chain sprocket 48 may be pivoted on sprocket axle 52 provided on the rear frame 18. A pedal assembly 54 including a right pedal 56 and left pedal 58 may be attached to the chain sprocket 48 by a one-way clutch, not shown. The electrical propulsion system may include a battery 62 suitably mounted on the seat support 32 and a motor 64 that is connected to the chain sprocket 48 by a one-way clutch, not shown. The chain sprocket 48 may be connected to the rear wheel 28 by a chain 66 and a rear sprocket 68.

Figure 4:
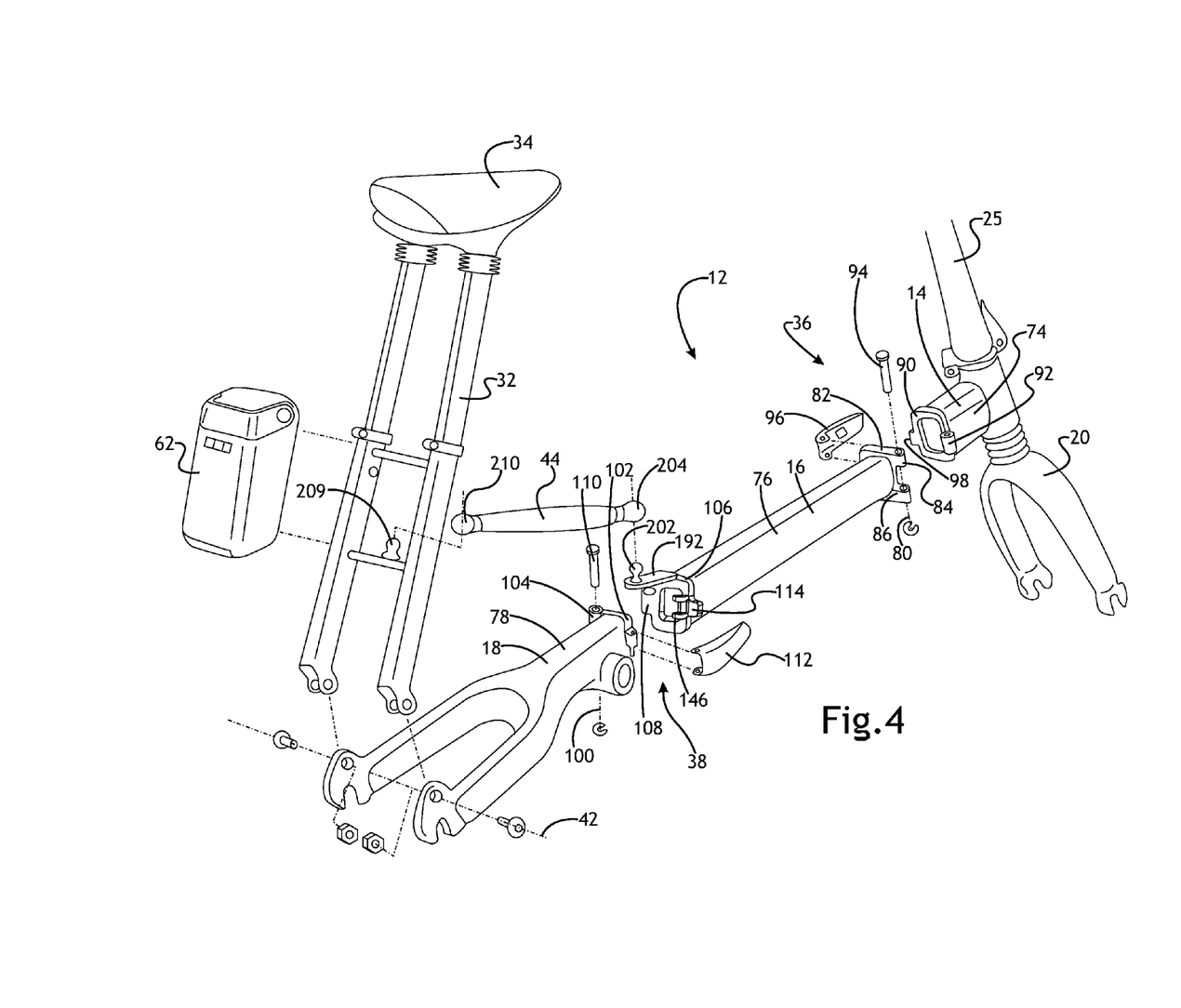
FIG. 4 is a perspective view of a bicycle frame having a front hinge assembly and a rear hinge assembly.

As seen in FIG. 4, the front frame 14, the middle frame 16 and the rear frame 18 may each be of hollow tubular structure. The front frame 14 may have a tube 74, the middle frame 16 may have a tube 76, and the rear frame 18 may have a tube 78, and these tubes may be of round, oval, or rectangular cross-section.

The front hinge assembly 36 may provide for rotation of the front frame 14 relative the middle frame 16 about a hinge axis 80 that is located on the right hand side of the frame 12. The front end of the middle frame 16 may have an end plate 82 that may have an upper flange 84 and lower flange 86 that are spaced one above the other on the right hand side of the frame 12. The rear end of the front frame 14 may have an end plate 90 that may have a flange 92 that extends between the upper and lower flanges 84 and 86. A hinge pin 94 extends through aligned holes in the flanges 84, 86, and 92 to establish the hinge axis 80. A latch lever 96 is pivoted on the middle frame 16 and engages a latch tab 98 that extends from the end plate 90. The latch lever 96 may be engaged with the latch tab 98 to lock the front frame 14 and the middle frame 16 to one another during riding of the bicycle. And the latch lever 96 may be released and disengaged from the latch tab 98 to permit folding of the bicycle about the hinge axis 80.

The rear hinge assembly 38 may provide for rotation of the middle frame 16 relative the rear frame 18 about a hinge axis 100 that is located on the left hand side of the frame 12. The front end of the rear frame 18 may have an end plate 102 that may have an upper flange 104 and a lower flange, not shown, that are spaced one above the other on the left hand side of the rear frame 18. The rear end of the middle frame 14 may have an end plate 106 that may have a flange 108 that extends between the upper and lower flanges of the end plate 102. A hinge pin 110 extends through aligned holes in the flanges of the end plates 102 and 106 to establish the hinge axis 100. A latch lever 112 is pivoted on the rear frame 18 and engages a latch tab 114 that extends from the end plate 106. The latch lever 112 can be engaged with the latch tab 114 to lock the middle frame 16 and the rear frame 18 to one another during riding of the bicycle. And the latch lever 112 can be disengaged from the latch tab 114 to permit folding of the bicycle about the hinge axis 100.

Figure 5:
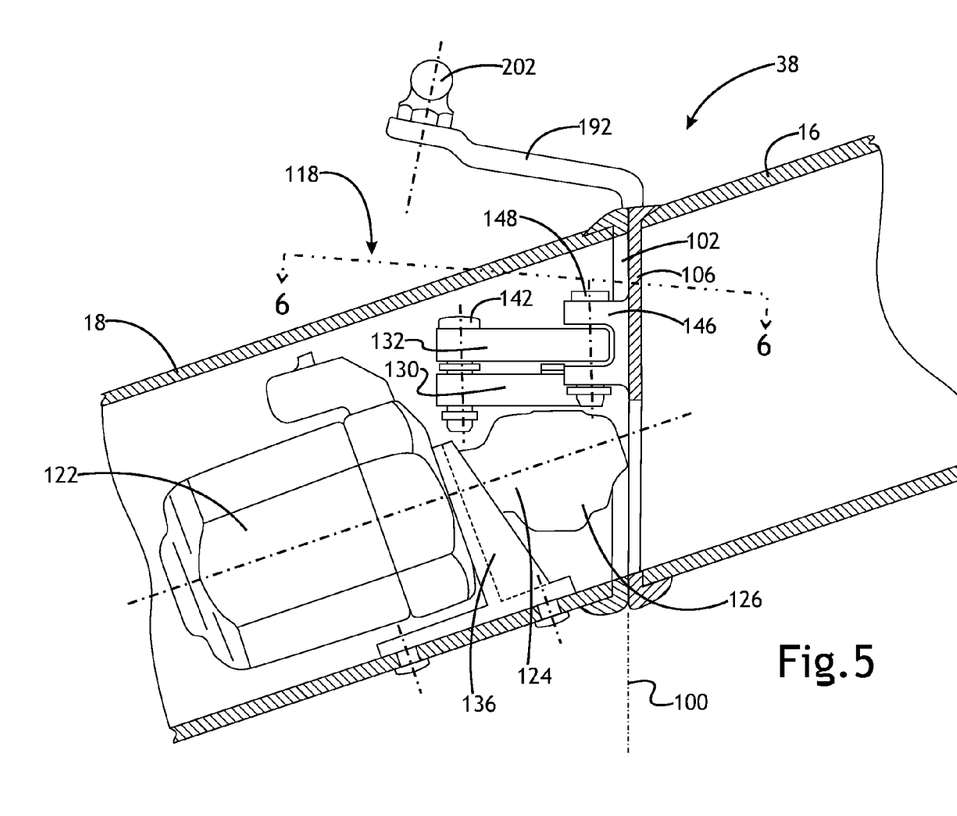
FIG. 5 is a side view of a rear hinge assembly having parts broken away and in section.
Figure 6:
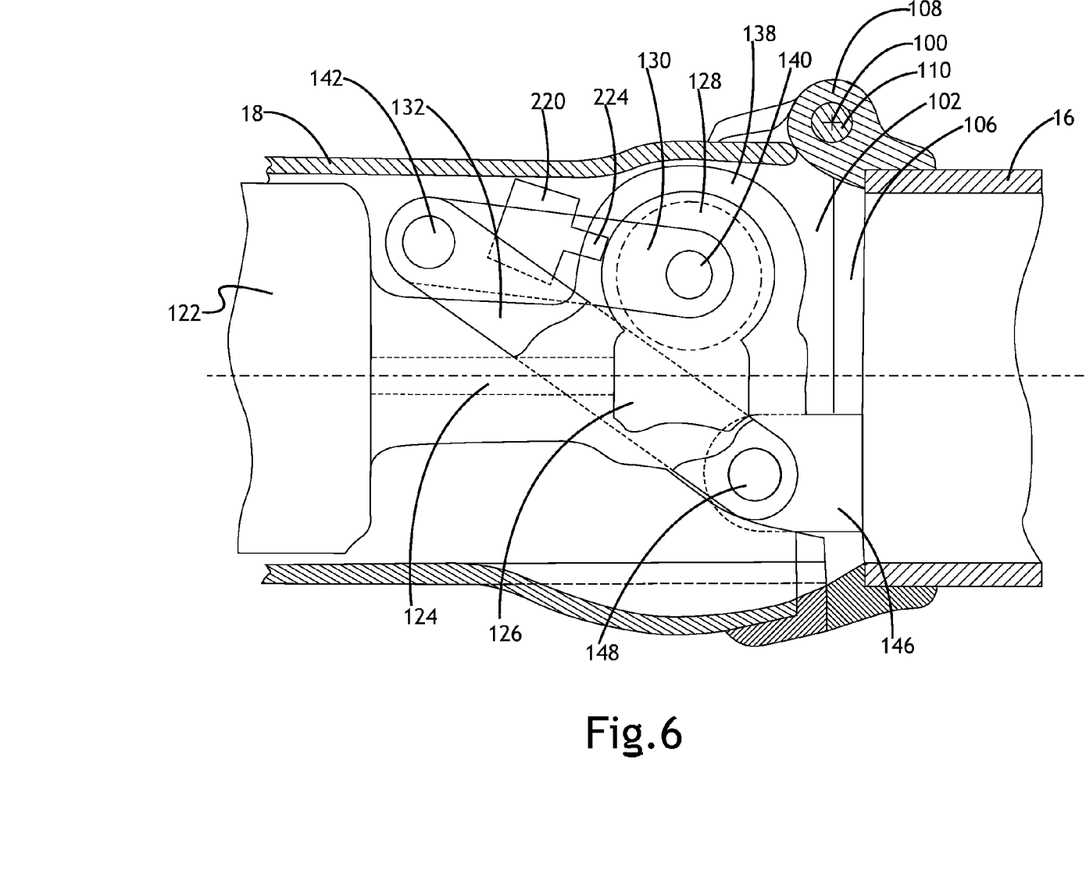
FIG. 6 is a section view taken in the direction of arrows 6-6 of FIG. 5.

Referring to FIGS. 5 and 6, the rear hinge assembly 38 may have an electric motor actuator mechanism, generally indicated at 118, for forcibly rotating the middle frame 16 about the rear hinge axis 100. The electric motor actuator mechanism 118 may include generally electric motor 122, motor shaft 124, pinion gear 126, driven gear 128, first link 130 and second link 132. The electric motor may be mounted on the tube of rear frame 18 by motor mount 136. The electric motor 122 may include a housing 138 in which the driven gear 128 may be mounted for rotation on a gear shaft 140 journaled on the housing 138. The first link 130 may be keyed to the driven gear 128 for rotation therewith and may be pivotally connected to the second link 132 by a pivot pin 142. A stanchion 146 may be mounted on the end plate 106 of the middle frame 16. The second link 132 may be pivotally connected to the stanchion 146 by a pivot pin 148. The pinion gear 126 may be mounted on the end of the motor shaft 124 and may mesh with the driven gear 128.

Figure 7:
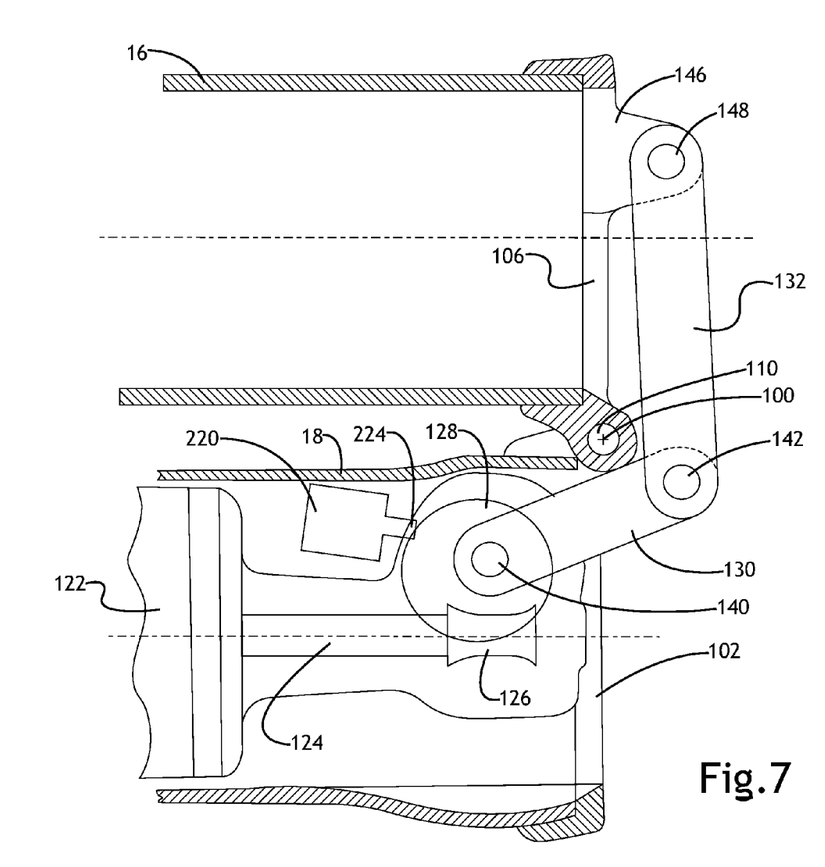
FIG. 7 is a view similar to FIG. 6 but showing the bicycle frame folded.
Figure 8:
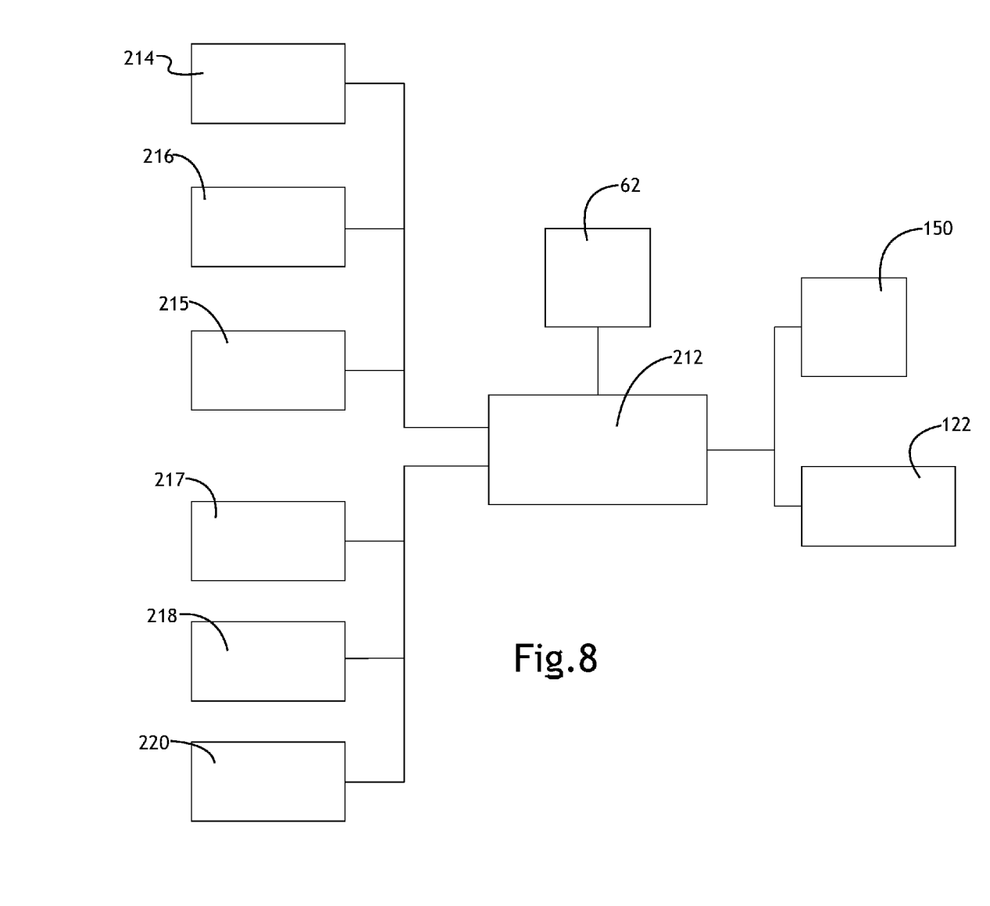
FIG. 8 is a diagram of an electrical control system.

In operation, energization of the electric motor 122 will turn the pinion gear 126, which will turn the driven gear 128, which will rotate the first link 130 counter clockwise, causing the first link to push the second link 132 from the position of FIG. 6 to the position of FIG. 7. Thus the middle frame 16 has pivoted about the rear hinge axis 100 to the folded position of FIG. 7. Reversing the electric motor 122 will in turn rotate the first link 130 clockwise and withdraw the second link 132, causing the middle frame 16 to pivot clockwise and be unfolded back to its position of FIG. 6.

The front hinge 36 may be provided with an electric motor actuator mechanism similar to that of the rear hinge 38 as described hereinbefore and shown in FIGS. 5-7. The electric motor actuator mechanism of the front hinge 36 may include an electric motor 150.

As seen in FIGS. 5-6, end plate 106 of middle frame 16 may have a lever arm 192. This lever arm 192 may be attached to the support rod 44 by a ball swivel joint 200 that includes a ball stud 202 mounted on the end of the lever arm 192 and a socket 204 that may be attached to the end of the support rod 44. Referring again to FIG. 1, it is seen that the rear end of the support rod 44 may be attached to the seat support 32 by a similar ball swivel joint 208 that may have a ball stud 209 mounted on the seat support 32 and a socket 210 that may be attached to the end of the support rod 44. It will be understood that upon a pivoting of the middle frame 16 about the rear hinge axis 100, the lever arm 192 may rotate, thereby pulling or pushing support rod 44 which in turn may result in a pivoting of the seat support 32 about its pivot 42 to thereby move the seat support 32 either closer to or further away from the rear frame 18.

FIG. 7 shows a block diagram for an example of an electrical control system, which may be used for operating the electrical motors 122 and 150 of the front and rear hinge assemblies. As seen in FIG. 7, the battery 62 may supply electrical power to a controller 212 which in turn may provide power to the motor 150 associated with the front hinge assembly 36 and the electric motor 122 associated with the rear hinge assembly 38. The controller 212 may receive input(s) from a seat switch 214 and a handlebar switch 216. Referring again to FIG. 1 the seat switch 214 may be mounted beneath the seat 34. The handlebar switch 216 may be mounted on the handle bar 25, for example, but not limited to, on the adjacent the left hand grip thereof. Accordingly, as seen in FIG. 1, when the user stands on the left-hand side of the bicycle 10 the user may place one hand on the handle bar with his thumb on the handlebar switch 216, while simultaneously using the right-hand may grip the seat 34 with the finger adjacent the seat switch 214. The user may initiate the power assisted folding of the bicycle by operating the seat switch 214 and handlebar switch 216, while the occupant's hands are steadying the bicycle against tipping over by gripping the handlebar 25 and the seat 34.

Also, as seen in FIG. 7, a switch or sensor 215 may be associated with the latch lever 96 and a switch or sensor 217 may be associated with the latch lever 112. These switches provide input to the controller 212 to sense whether the latches are latched or released, and the controller will assure that the user has released the latch before the motors 122 and 150 are energized.

As seen in FIG. 7, the electrical control system also may include a rotary sensor 218 associated with the front hinge assembly 36 and an rotary sensor 220 associated with the rear hinge assembly 38. Referring again to FIGS. 6 and 7, the rotary sensor 220 may have an induction pickup 224 that is positioned closely adjacent the teeth of the driven gear 128. Rotation of the driven gear 128 will be sensed by the rotary sensor 220 and signals from the induction pickup 224 can be interpreted by the controller 212 to determine the direction, position, and speed of rotation of the driven gear 128. The rotary sensor 218 of the electric motor actuator of the front hinge 36 will likewise sense the rotation of the drive gear of the front hinge 36 and can be interpreted by the controller 212 to determine the direction, position, and speed of rotation of the front hinge 36. The controller 212 may be programmed to energize the motors 122 and 150 associated with the front hinge assembly 36 and rear hinge assembly 38 in a manner to fold the bicycle 10 from its position of FIG. 1 to its position of FIG. 2. During such folding action, the middle frame 16 may swing about the rear hinge assembly 38 and the front frame may swing about the front hinge assembly 36 so that the bicycle 10 obtains its folded position of FIG. 2 in which the front wheel 24 may have assumed a position that is parallel with the rear wheel 28, with a space of 6 to 8 inches between the front and rear wheels.

Figure 2:
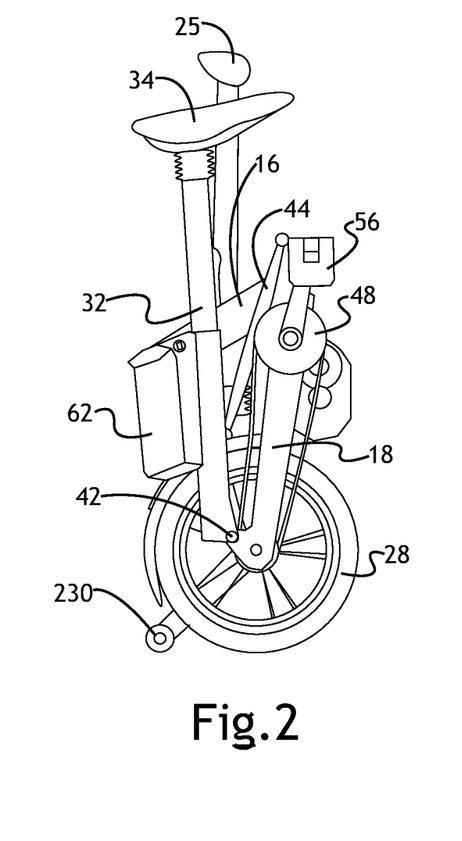
FIG. 2 shows the bicycle of FIG. 1 folded to a position for easy rolling by the user.

In comparing FIGS. 1 and 2, it is seen that during the pivoting of the rear hinge assembly 38, the lever arm 192 may have effectively pulled the seat support rod 44 forwardly which may cause the seat support 32 to assume a more vertical position. Furthermore, as seen in FIGS. 1 and 2, the bicycle 10 may have a third wheel 230 that may be attached to the rear frame 18 by a wheel support bar 232. As seen in FIG. 2, the upward rotation of the rear frame 18 about the rear axle 26 may cause the third wheel 230 to be lowered into contact with the ground surface. Thus, as seen in FIG. 2, the bicycle 10 may now stand on its own and the user may be free to remove his hands from the seat 34 and the handlebar 25. In addition, it will be understood that the contact of the third wheel 230 with the ground may allow the upright folded bicycle of FIG. 2 to be easily rolled along the ground surface, thus facilitating transport of the folded bicycle by the user.

Figure 3:
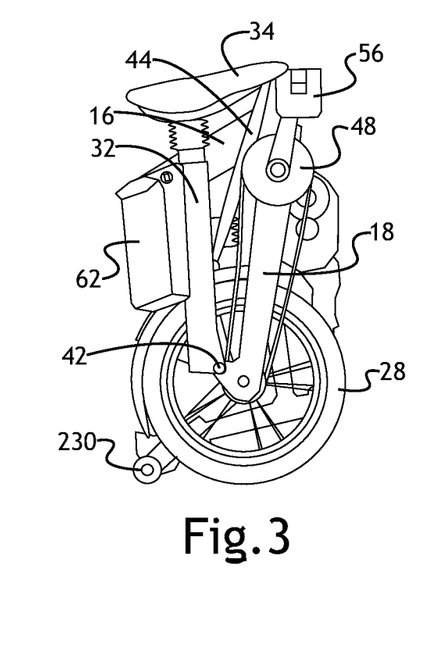
FIG. 3 shows the bicycle of FIG. 1 fully folded for compact storage.

FIG. 3 is another view of the bicycle in which the folded bicycle of FIG. 2 may be further compacted by lowering the seat 34 and folding the handle bars 25. The seat support 32 may include telescoping rods including an upper tube 234 attached to the seat and a lower tube 236. A releasable clamp mechanism 238 may permit the seat 34 to be raised and lowered. The handlebar assembly 25 may include hinges for the left handlebar and right handlebar (not shown in the drawings) so that the hinges may be folded downwardly. In addition, if desired, the right pedal 56 and the left pedal 58 may be of the pivoting type to permit folding to the collapsed position of FIGS. 2 and 3, further reducing the size of the folded bicycle 10.

It will be understood that the foregoing examples of variations are merely illustrative and many variations can be practiced. For example, the foregoing examples provide motor powered assist at both the front hinge assembly 36 and the rear hinge assembly 38. It may be desirable to reduce the cost of the bicycle by providing such motorized assist at only one or the other of the hinges. Furthermore, although we show both a seat switch 214 and a handlebar switch 216, a number of variations may include only one or the other of the switches, and the control switch or switches could be located at alternative locations on the bicycle if desired. The handlebar switch 216 may be activated by the hand brake lever. The rotary sensors shown and described herein are just one example of a sensor that could be employed. A person of ordinary skill in the art will recognize that alternative switches and sensors may be employed in the practice of the power assisted folding of the bicycle. For example, limit switches can be used to sense the limits of the rotation of the hinge pins.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a folding bicycle which may include a frame; at least one hinge assembly provided in the frame whereby the bicycle can be folded to a compact position for storage; and an electric motor actuator mechanism associated with the at least one hinge assembly whereby energization of the electric motor actuator mechanism causes a folding of the bicycle at the at least one hinge assembly.

Variation 2 may include a folding bicycle as set forth in Variation 2 and further comprising the frame having a front frame, a middle frame and a rear frame, a front hinge assembly pivotally connecting the front frame and the middle frame, a rear hinge assembly pivotally connecting the middle frame and the rear frame, and an electric motor actuator mechanism associated with each of the front hinge assembly and the rear hinge assembly.

Variation 3 may include a folding bicycle as set forth in any of Variations 1-2 wherein the electric motor actuator mechanism comprises an electric motor rotating a pinion gear, a driven gear rotated by the pinion gear, and a linkage having a first link rotated by the driven gear and pushing and pulling a second link.

Variation 4 may include a folding bicycle as set forth in any of Variations 1-3 and further comprising a sensor associated with the at least one hinge mechanism, and a controller that monitors the sensor and controls the electric motor actuator mechanism.

Variation 5 may include a folding bicycle as set forth in any of Variations 1-4 and further comprising an electrical switch provided on at least one of a bicycle seat and the handle bar for actuation by a user to initiate the folding while the user simultaneously grips the at least one of the bicycle seat and the handle bar to steady the bicycle during the folding of the frame.

Variation 6 may include a folding bicycle as set forth in any of Variations 1-5 and further comprising a vehicle seat supported on a seat support pivoted to the frame, a support rod extending between the seat support and the at least one hinge mechanism, and upon folding of the bicycle the hinge mechanism operating the support rod to pivot the seat support relative the frame whereby the seat support is pivoted to a storage position close to the frame.

Variation 7 may include a folding bicycle as set forth in any of Variations 1-6 and wherein the frame comprises first and second frame portions hingedly connected by the at least one hinge assembly, and the electric motor actuator mechanism comprises an electric motor mounted on the first frame portion, a pinion gear driven by the electric motor, a driven gear meshing with the pinion gear, and a linkage acting between the driven gear and the second frame porting to rotate the frame portions about the hinge assembly upon energization of the electric motor.

Variation 8 may include a folding bicycle as set forth in any of Variations 1-7 further comprising the electric motor actuator mechanism having an electric motor rotating a pinion gear, a driven gear rotated by the pinion gear, and a linkage having a first link rotated by the driven gear and pushing and pulling a second link; a rotary sensor sensing the rotation of the driven gear; and a controller that monitors the rotary sensor and controls the electric motor actuator mechanism.

Variation 9 may include a folding bicycle as set forth in any of Variations 1-8 wherein the frame comprises first and second frame portions hingedly connected by the at least one hinge assembly, and a releasable latch connecting the first and second frame portions to latch the first and second frame portions during riding of the bicycle.

Variation 10 may include a folding bicycle as set forth in any of Variations 1-9 wherein the frame comprises first and second frame portions hingedly connected by the at least one hinge assembly, and further comprising a latch engaging the first and second frame portions to latch the first and second frame portions during riding of the bicycle and release the first and second frame portions for folding, a switch sensing whether the latch is engaged or disengaged, and a controller that monitors the switch and controls the electric motor actuator mechanism.

Variation 11 may include a folding bicycle comprising: a frame having a having a front frame, a middle frame and a rear frame; a front hinge assembly pivotally connecting the front frame and the middle frame; a rear hinge assembly pivotally connecting the middle frame and the rear frame; a first electric motor actuator mechanism associated with the front hinge assembly for folding the frame about the front hinge assembly; and, a second electric motor actuator mechanism associated with the front hinge assembly for folding the frame about the second hinge assembly.

Variation 12 may include a folding bicycle as set forth in Variation 11 wherein each of the first and second electric motor actuator mechanisms comprises an electric motor rotating a pinion gear, a driven gear rotated by the pinion gear, and a linkage having a first link rotated by the driven gear and pushing and pulling a second link.

Variation 13 may include a folding bicycle as set forth in any of Variations 11-12 further comprising each of the first and second electric motor actuator mechanism having a rotary sensor for sensing the hinging movement of the frame about the first and second hinge assemblies.

Variation 14 may include a folding bicycle as set forth in any of Variations 11-13 further comprising a first releasable latch engaging the front frame and the middle frame and a second releasable latch engaging the middle frame and rear frame to latch the frame against folding during riding of the bicycle, said first releasable latch and said second releasable latch being disengageable to permit folding of the frame.

Variation 15 may include a folding bicycle as set forth in any of Variations 11-14 further comprising each of the first and second releasable latches having a switch associated therewith for sensing whether each of the latches is engaged or released.

Variation 16 may include a folding bicycle as set forth in any of Variations 11-15 further comprising each of the first and second electric motor actuator mechanism having a rotary sensor for sensing the hinging movement of the frame about the first and second hinge assemblies; and a controller receiving input from the rotary sensors and controlling the first and second electric motor actuator mechanism.

Variation 17 may include a folding bicycle comprising a frame having a front frame, a middle frame and a rear frame;

a front hinge assembly pivotally connecting the front frame and the middle frame; a rear hinge assembly pivotally connecting the middle frame and the rear frame; a first electric motor actuator mechanism associated with the front hinge assembly for folding the frame about the front hinge assembly; a second electric motor actuator mechanism associated with the rear hinge assembly for folding the frame about the rear hinge assembly; each of the first and second electric motor actuator mechanism having a sensor for sensing the hinging movement of the frame; each of the front and rear hinge assemblies having a releasable latch for latching the frame against folding and releasing the frame for folding; each of the releasable latches having a switch associated therewith; and a controller receiving input from the sensors and switches and controlling the first and second electric motor actuator mechanisms.

Variation 18 may include a folding bicycle as set forth in Variation 17 wherein each of the front frame, middle frame and rear frame are hollow tubular members, and the first electric motor actuator mechanism is located inside either the front frame or the middle frame, and the second electric motor actuator mechanism is located inside the middle frame or the rear frame.

Variation 19 may include a folding bicycle as set forth in any of Variations 17-18 wherein each of the first and second electric motor actuator mechanisms comprises an electric motor rotating a pinion gear, a driven gear rotated by the pinion gear, and a linkage having a first link rotated by the driven gear and pushing and pulling a second link.

Variation 20 may include a folding bicycle as set forth in any of Variations 17-19 further comprising a switch under a seat of the bicycle and a switch on a handlebar of the bicycle, said switches being connected to the controller and permitting a user to activate the first and second electric motor actuator mechanisms while holding the bicycle by the seat and the handlebar.

The above description of select variations within the scope of the invention is merely illustrative in nature and, thus, variations or variants thereof are not to be regarded as a departure from the spirit and scope of the invention.

The invention claimed is:

1. A folding bicycle comprising:
 a frame;
 at least one hinge assembly provided in the frame whereby the bicycle can be folded to a compact position for storage; and
 an electric motor actuator mechanism associated with the at least one hinge assembly, wherein the electric motor actuator mechanism comprises an electric motor rotating a pinion gear, a driven gear rotated by the pinion gear, and a linkage having a first link rotated by the driven gear and pushing and pulling a second link, and whereby energization of the electric motor actuator mechanism causes a folding of the bicycle at the at least one hinge assembly.

2. The folding bicycle of claim 1 further comprising the frame having a front frame, a middle frame and a rear frame, a front hinge assembly pivotally connecting the front frame and the middle frame, a rear hinge assembly pivotally connecting the middle frame and the rear frame, and an electric motor actuator mechanism associated with each of the front hinge assembly and the rear hinge assembly.

3. The folding bicycle of claim 1 further comprising a sensor associated with the at least one hinge mechanism, and a controller that monitors the sensor and controls the electric motor actuator mechanism.

4. The folding bicycle of claim 1 further comprising an electrical switch provided on at least one of a bicycle seat and the handle bar for actuation by a user to initiate the folding while the user simultaneously grips the at least one of the bicycle seat and the handle bar to steady the bicycle during the folding of the frame.

5. The folding bicycle of claim 1 further comprising a vehicle seat supported on a seat support pivoted to the frame, a support rod extending between the seat support and the at least one hinge mechanism, and upon folding of the bicycle the hinge mechanism operating the support rod to pivot the seat support relative the frame whereby the seat support is pivoted to a storage position close to the frame.

6. The folding bicycle of claim 1 wherein the frame comprises first and second frame portions hingedly connected by the at least one hinge assembly, and the electric motor actuator mechanism comprises an electric motor mounted on the first frame portion, a pinion gear driven by the electric motor, a driven gear meshing with the pinion gear, and a linkage acting between the driven gear and the second frame portion to rotate the frame portions about the hinge assembly upon energization of the electric motor.

7. The folding bicycle of claim 1 further comprising:
 a rotary sensor sensing the rotation of the driven gear;
 and a controller that monitors the rotary sensor and controls the electric motor actuator mechanism.

8. The folding bicycle of claim 1 wherein the frame comprises first and second frame portions hingedly connected by the at least one hinge assembly, and a releasable latch connecting the first and second frame portions to latch the first and second frame portions during riding of the bicycle.

9. The folding bicycle of claim 1 wherein the frame comprises first and second frame portions hingedly connected by the at least one hinge assembly, and further comprising a latch engaging the first and second frame portions to latch the first and second frame portions during riding of the bicycle and release the first and second frame portions for folding, a switch sensing whether the latch is engaged or disengaged, and a controller that monitors the switch and controls the electric motor actuator mechanism.

10. A folding bicycle comprising:
 a frame having a having a front frame, a middle frame and a rear frame,
 a front hinge assembly pivotally connecting the front frame and the middle frame;
 a rear hinge assembly pivotally connecting the middle frame and the rear frame;
 a first electric motor actuator mechanism associated with the front hinge assembly for folding the frame about the front hinge assembly;
 a second electric motor actuator mechanism associated with the front hinge assembly for folding the frame about the second hinge assembly; and
 wherein each of the first and second electric motor actuator mechanisms comprises an electric motor rotating a pinion gear, a driven gear rotated by the pinion gear, and a linkage having a first link rotated by the driven gear and pushing and pulling a second link.

11. The folding bicycle of claim 10 further comprising each of the first and second electric motor actuator mechanism having a rotary sensor for sensing the hinging movement of the frame about the first and second hinge assemblies.

12. The folding bicycle of claim 10 further comprising a first releasable latch engaging the front frame and the middle frame and a second releasable latch engaging the middle frame and rear frame to latch the frame against folding during riding of the bicycle, said first releasable latch and said second releasable latch being disengageable to permit folding of the frame.

13. The folding bicycle of claim 12 further comprising each of the first and second releasable latches having a switch associated therewith for sensing whether each of the latches is engaged or released.

14. The folding bicycle of claim 12 further comprising each of the first and second electric motor actuator mechanism having a rotary sensor for sensing the hinging movement of the frame about the first and second hinge assemblies; and a controller receiving input from the rotary sensors and controlling the first and second electric motor actuator mechanism.

15. A folding bicycle comprising:
a frame having a having a front frame, a middle frame and a rear frame,
a front hinge assembly pivotally connecting the front frame and the middle frame,
a rear hinge assembly pivotally connecting the middle frame and the rear frame;
a first electric motor actuator mechanism associated with the front hinge assembly for folding the frame about the front hinge assembly;
a second electric motor actuator mechanism associated with the rear hinge assembly for folding the frame about the rear hinge assembly;
each of the first and second electric motor actuator mechanism having a sensor for sensing the hinging movement of the frame;
each of the front and rear hinge assemblies having a releasable latch for latching the frame against folding and releasing the frame for folding;
each of the releasable latches having a switch associated therewith; and
a controller receiving input from the sensors and switches and controlling the first and second electric motor actuator mechanisms.

16. The folding bicycle of claim 15 wherein each of the front frame, middle frame and rear frame are hollow tubular members, and the first electric motor actuator mechanism is located inside either the front frame or the middle frame, and the second electric motor actuator mechanism is located inside the middle frame or the rear frame.

17. The folding bicycle of claim 16 wherein each of the first and second electric motor actuator mechanisms comprises an electric motor rotating a pinion gear, a driven gear rotated by the pinion gear, and a linkage having a first link rotated by the driven gear and pushing and pulling a second link.

18. The folding bicycle of claim 15 further comprising a switch under a seat of the bicycle and a switch on a handlebar of the bicycle, said switches being connected to the controller and permitting a user to activate the first and second electric motor actuator mechanisms while holding the bicycle by the seat and the handlebar.

* * * * *